United States Patent Office

Re. 27,933
Reissued Feb. 26, 1974

27,933

PHOTOGRAPHIC MATERIAL FOR THE SILVER DYE BLEACHING PROCESS

Heinrich Bruengger, Basel, and Carlo Boragine, Fribourg, Switzerland, by Ciba-Geigy AG, Basel, Switzerland, assignee

No Drawing. Original No. 3,635,716, dated Jan. 18, 1972, Ser. No. 852,075, Aug. 21, 1969. Application for reissue May 10, 1973, Ser. No. 360,245

Claims priority, application Switzerland, Aug. 26, 1968, 12,771/68

Int. Cl. G03c *1/72*

U.S. Cl. 96—99 10 Claims

Matter enclosed in heavy brackets [ ] appears in the original patent but forms no part of this reissue specification; matter printed in italics indicates the additions made by reissue.

ABSTRACT OF THE DISCLOSURE

Photographic material for the silver dyestuff bleaching process is provided which contains in at least one silver halide emulsion layer a bleachable azo dyestuff as image dyestuff and an asymmetrically substituted thiocarbocyanine as red sensitizer. Unexpectedly high relative sensitivities are achieved with these sensitizers which may have a betainelike structure, especially in the presence of polyazo dyestuffs.

The present invention provides a photographic material for the silver dye bleaching process which contains in at least one silver halide emulsion layer, a bleachable azo dye as image dye, wherein this layer contains a red sensitizer of the formula (I)

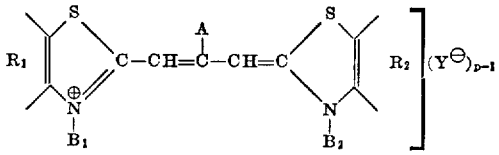

which may have a betainelike structure, in which A represents a hydrogen atom or an alkyl group containing one to four carbon atoms; $R_1$ and $R_2$ each represents an alkyl group containing one to four carbon atoms, an alkylcarboxylic acid residue containing one to five carbon atoms, a sulfatoalkyl residue containing one to four carbon atoms or an alkylsulfonic acid residue in which alkyl is a residue of the formula $—C_nH_{2n}—$ n being a whole number from 1 to 4, and in which an acid group $B_1$ or $B_2$ may have a betainelike structure; $R_1$ and $R_2$ are dissimilar aromatic ring systems which contain at most two six-membered rings and are fused on in the manner indicated by the valency lines; $Y^{\ominus}$ represents an anion and p=1 in the case of a betainelike structure or p=2 when the molecular structure is not betainelike.

Betainelike structures result when at least one of the residues $B_1$ or $B_2$ represents a sulfatoalkyl or an alkylsulfonic acid residue, or when $B_1$ and $B_2$ each represents an alkylcarboxylic acid residue. In the betainelike structure there is no anion $Y^{\ominus}$ because the anion is already present in the molecule of the sensitizer itself, that is to say is linked by a homopolar bond with the N-alkyl group of the sensitizer. This is also referred to as a zwitterion or an inner salt. When $B_1$ and $B_2$ each represents an alkyl group or one of them represents an alkyl group and the other an alkylcarboxylic acid residue, the sensitizer does not have a betainelike structure, and the anion $Y^{\ominus}$ neutralizes the positive charge of the actual sensitizer molecule.

When both $B_1$ and $B_2$ represent alkyl groups, the products concerned are basic cyanine dyestuffs. When only one of the residues $B_1$ or $B_2$ represents an alkyl group and the other an alkylsulfonic acid or sulfatoalkyl residue, the cyanine dyestuffs concerned are neutral. The invention is concerned with acid cyanine dyestuffs when $B_1$ and $B_2$ represent acid groups, that is to say alkylcarboxylic acid groups, alkylsulfonic acid groups or sulfatoalkyl groups.

Particularly suitable for the silver dye bleaching process is a photographic material that contains a red sensitizer of the formula (II)

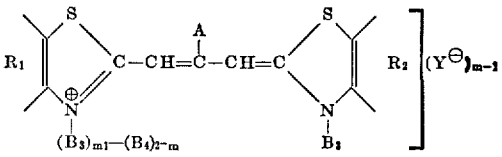

in which A represents a hydrogen atom or an alkyl group containing one to four carbon atoms; $R_3$ represents an alkyl group containing one to four carbon atoms or an alkylcarboxylic acid residue containing one to five carbon atoms; $B_4$ represents a sulfatoalkyl residue containing one to four carbon atoms or an alkylsulfonic acid residue in which alkyl is a residue of the formula $—C_nH_{2n}—$ and $n$ is a whole number from 1 to 4, preferably from 1 to 3; $B_5$ represents an alkyl group containing one to four carbon atoms; $R_1$ and $R_2$ represent dissimilar aromatic ring systems which contain at most two six-membered rings and are fused on in the manner indicated by the valency lines; $Y^{\ominus}$ represents an anion and $m=1$ or 2.

A preferred photographic material contains a sensitizer not having a betainelike structure, corresponding to the formula (III)

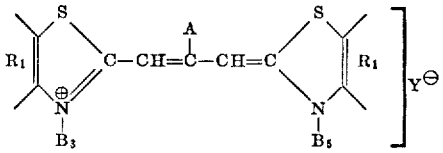

in which A, $B_3$, $B_5$, $R_1$, $R_2$ and $Y^{\ominus}$ have the meanings defined above.

The residue A in the Formulas I to III is in the so-called meso-position of the trimethine chain of the molecule; it is either a hydrogen atom or a methyl, propyl, butyl or especially an ethyl group.

The residues $B_1$ and $B_2$ are residues of the formulas (IV) —alkylene—H,
(V) —alkylene—COOH,
(VI) —alkylene—O—$SO_3H$ or
(VII) —alkylene—$SO_3H$, in which alkylene stands for an alkylene group containing one to four carbon atoms.

As relevant examples the following residues may be mentioned; methyl, ethyl, propyl, isobutyl groups, acetic acid residues, propionic acid residues, valeric acid residues, sulfatomethyl, sulfatoethyl, propylsulfonic acid or butylsulfonic acid residues.

Specially valuable in this connection are sensitizers of the formula (VIII)

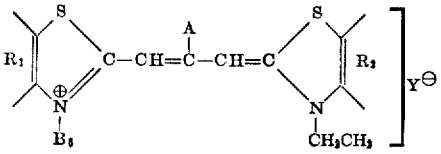

in which $B_6$ represents an ethyl, methylcarboxylic acid or ethylcarboxylic acid residue, and A, $R_1$, $R_2$ and $Y^{\ominus}$ have the meanings defined above.

The residues $R_1$ and $R_2$ in the Formulas I to III represent ring systems fused on as indicated by the valency lines, which must always be different from each other, have an aromatic character and contain at most two six-membered rings $R_1$ and $R_2$ may be different from each other insofar as the type of the ring systems, the kind and number of the substituents in the same ring system or the positions of identical substituents in the same ring system are concerned. $R_1$ and $R_2$ may represent the complements, for example, to the following residues: benzene or naphthalene residues, tetrahydronaphthalene residues or heterocyclic residues, for example coumarone, thionaphthene or benzo-α-pyrane residues. All these residues may, of course, carry a wide variety of substituents, for example halogen atoms, alkyl, aryl or heterocyclic residues, and these alkyl or aryl residues or heterocyclic residues may be bound to the ring system directly or through a hetero atom, for example and oxygen or a sulfur atom. Therefore, $R_1$ and $R_2$ may also be, for example diphenyl, furylbenzene or thienylbenzene residues.

Very good results have been achieved with sensitizers of the formula (IX)

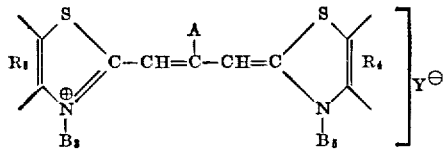

in which $R_3$ and $R_4$ represent dissimilar benzene or naphthalene residues, which are fused on in the manner indicated by the valency lines and may be substituted by hydrogen atoms, halogen atoms, alkyl or alkoxy groups each containing one to three carbon atoms, and A, $B_3$, $B_5$ and Y have the above meanings.

Among these sensitizers those are preferred which correspond to the formula (X)

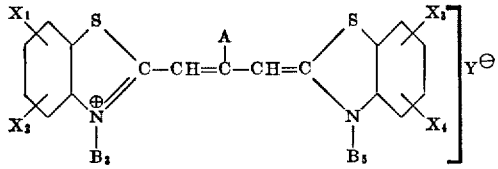

in which $X_1$, $X_2$, $X_3$ and $X_4$ each represents a hydrogen or halogen atom, or an alkyl or alkoxy group each containing one to three carbon atoms, and the substituent pair $X_1/X_2$ must differ from the substituent pair $X_3/X_4$ as to kind or position, and A, $B_3$, $B_5$ and $Y^{\ominus}$ have the above meanings.

The residues $X_1$ and $X_3$ are preferably in the 6- or 7-position or 6'- or 7'-position, and the residues $X_2$ and $X_4$ are in the 5- and 5'-position respectively.

In this connection sensitizers of the formula (XI)

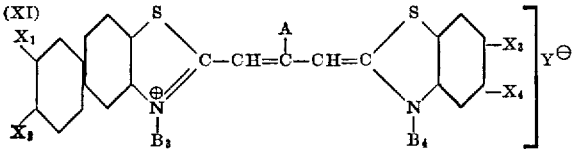

are especially valuable; in this formula A, $B_3$, $B_5$, $X_1$, $X_2$, $X_3$, $X_4$ and $Y^{\ominus}$ have the above meanings and the substituent pair $X_1/X_2$ is different from the substituent pair $X_3/X_4$.

Of very special value are the sensitizers of the formula (XII)

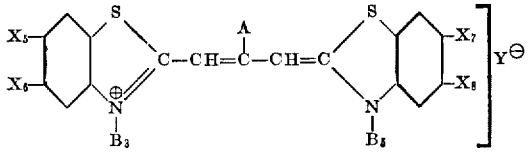

in which $X_5$, $X_6$, $X_7$, and $X_8$ each represents a hydrogen or chlorine atom, or a methyl, methoxy or ethoxy group, and the substituent pair $X_5/X_6$ must be different from the substituent pair $X_7/X_8$, and A, $B_3$, $B_5$ and $Y^{\ominus}$ have the above meanings.

The residue $Y^{\ominus}$ in the Formulas I to III and VIII to XII represents one of the anions conventionally used in the chemistry of the cyanine dyestuffs, which as is known have a minor importance for the sensitizing effect (cf. F. M. Hamer, "The Cyanine Dyes and Related Compounds," chapter 10, page 296). Sensitizers containing preferred anions correspond to the formula (XIII)

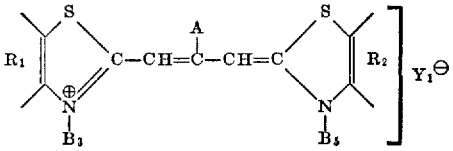

in which $Y_1^{\ominus}$ represents a halogen, thiocyanate, perchlorate, nitrate, methylsulfate, ethylsulfate or para-toluenesulfonate ion, and A, $B_3$, $B_5$, $R_1$ and $R_2$ have the meanings indicated above.

Especially effective red sensitizers correspond to the formula (XIV)

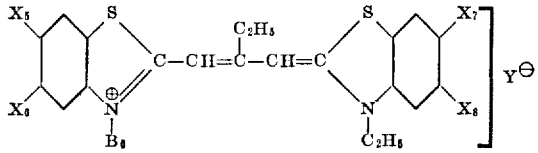

in which $Y^{\ominus}$, $B_6$, $X_5$, $X_6$, $X_7$ and $X_8$ have the above meanings.

Suitable representatives of the red sensitizers according to Formula I are, for example, the compounds shown in the following table in which there are listed in Column I—the formula number Column II—the absorption maximum in nm., measured in ethanol Column III—the sensitizing maximum, measured in an exposed and developed silver halide gelatine emulsion Remarks The compound No. 13[1] in the table contains a benzene ring fused on in the 4',5'-position instead of the residue $X_4$.

The compounds Nos 32[2] to 35[2] have additionally an $H_3S$ residue in the 7-position.

The compound No. 58[3] has additionally an $H_3C$ residue in the 7'-position.

The compound No. 65[4] contains a benzene ring fused on in the 6',7'-position.

TABLE 1

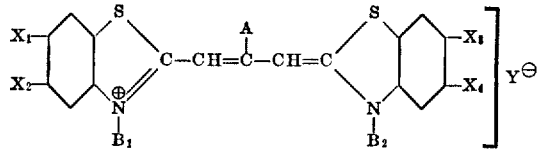

| I | $X_1$ | $X_2$ | $B_1$ | A | $B_2$ | $X_3$ | $X_4$ | $Y^{\ominus}$ | II | III |
|---|---|---|---|---|---|---|---|---|---|---|
| 1 | —H | —H | —$C_2H_5$ | —$C_2H_5$ | —$C_2H_5$ | —H | —Cl | $I^-$ | 553 | 640 |
| 2 | —H | —Cl | Same as above | Same | —$C_2H_5$ | —H | —$CH_3$ | $I^-$ | 554 | 640 |
| 3 | —H | —Cl | do | do | —$C_2H_5$ | —$OCH_3$ | —H | $I^-$ | 559 | 640 |
| 4 | —H | —Cl | do | do | —$C_2H_5$ | —$CH_3$ | —$CH_3$ | $I^-$ | 556 | 646 |
| 5 | —H | —H | do | do | —$CH_2CH_2COOH$ | —H | —Cl | $I^-$ | 561 | 640 |
| 6 | —H | —H | —$CH_2COOH$ | do | —$C_2H_5$ | —H | —Cl | $I^-$ | 551 | 630 |
| 7 | —H | —$CH_3$ | —$CH_2CH_2COOH$ | do | —$C_2H_5$ | —$CH_3$ | —$CH_3$ | $I^-$ | 558 | 644 |
| 8 | —H | —H | —$C_2H_3$ | do | —$CH_2CH_2COOH$ | —$CH_3$ | —$OC_2H_5$ | $I^-$ | 561 | 640 |
| 9 | —H | —Cl | —$C_2H_5$ | do | —$CH_2CH_2COOH$ | —$CH_3$ | —H | $I^-$ | 555 | 644 |
| 10 | —H | —H | —$CH_2$—$CH_2$—$CH_2$ (—$SO_3^-$) | do | —$C_2H_5$ | —H | —Cl | | 556 | 640 |
| 11 | —$CH_3$ | —$CH_3$ | Same as above | do | Same as above | —H | —Cl | | 559 | 648 |
| 12 | —H | —$CH_3$ | —$C_2H_5$ | —H | do | —$CH_3$ | —$OC_2H_5$ | $I^-$ | 578 | 620 |
| 13 [1] | —H | —Cl | —$C_2H_5$ | —$C_2H_5$ | do | —H | ([1]) | $I^-$ | 567 | |
| 14 | —H | —H | —$CH_2$—$CH_2$—$CH_3$ | Same | do | —H | —Cl | $I^-$ | 553 | 640 |
| 15 | —H | —Cl | —$C_2H_5$ | do | do | —$OCH_3$ | —$OCH_3$ | $I^-$ | 567 | 650 |
| 16 | —H | —Cl | —$CH_2$—$CH_2$—COOH | do | do | —H | —$CH_3$ | $I^-$ | 554 | 640 |
| 17 | —H | —Cl | —$C_2H_5$ | do | —$CH_2$—$CH_2$ (—COOH) | —$OCH_3$ | —$OCH_3$ | $I^-$ | 569 | 660 |
| 18 | —H | —H | —$CH_2CH_2CH_2$—$SO_3^-$ | do | —$C_2H_5$ | —H | —$CH_3$ | | 555 | 6 |
| 19 | —H | —Cl | —$C_2H_5$ | do | do | —$CH_3$ | Same | —$ClO_4$ | 557 | 640 |
| 20 | —H | —Cl | —$CH_2$—$CH_2$—COOH | do | do | —$CH_3$ | do | —$ClO_4$ | 555 | 644 |
| 21 | —H | —H | Same as above | do | do | —H | —Cl | $I^-$ | 550 | 646 |
| 22 | —H | —Cl | —$C_2H_5$ | do | do | —$CH_3$ | —H | $I^-$ | 554 | 640 |
| 23 | —H | —H | Same as above | do | —$CH_2$—$CH_2$ (—COOH) | —H | —$CH_3$ | $I^-$ | 553 | 636 |
| 24 | —H | —Cl | do | do | Same as above | —H | Same | $I^-$ | 555 | 650 |
| 25 | —H | —H | do | do | do | —$CH_3$ | do | $I^-$ | 556 | 634 |
| 26 | —H | —Cl | do | do | do | Same | do | $I^-$ | 558 | 646 |
| 27 | —H | —H | do | do | do | do | —H | $I^-$ | 553 | 640 |
| 28 | —H | —H | do | do | —$CH_2$—COOH | —H | —Cl | $I^-$ | 551 | 620 |
| 29 | —H | —H | do | do | —$CH_2$—$CH_2$ (—COOH) | —$OCH_3$ | —H | $I^-$ | 559 | 640 |
| 30 | —H | —Cl | do | do | Same as above | —$OCH_3$ | —H | $I^-$ | 559 | 650 |
| 31 | —H | —Cl | do | do | do | —$C_2H_5$ | —H | $I^-$ | 556 | 640 |
| 32 [2] | —H | —Cl | do | do | —$C_2H_5$ | —H | —$CH_3$ | $I^-$ | 556 | 640 |
| 33 [2] | —H | —H | do | do | —$CH_2$—$CH_2$ (—COOH) | —H | Same | $I^-$ | 555 | 620 |
| 34 [2] | —H | —Cl | do | do | Same as above | —H | do | $I^-$ | 555 | 640 |
| 35 [2] | —$CH_3$ | —$CH_3$ | do | do | do | —H | do | $I^-$ | 560 | 640 |
| 36 | —H | —H | do | —H | —$C_2H_5$ | —$OCH_3$ | —$OCH_3$ | $I^-$ | 578 | 620 |
| 37 | —H | —H | do | —$C_2H_5$ | —$CH_2$—$CH_2$ (—COOH) | —$OCH_3$ | —$OCH_3$ | $I^-$ | 567 | 640 |
| 38 | —H | —Cl | do | Same | Same as above | —$CH_3$ | —$OC_2H_5$ | $I^-$ | 563 | 640 |
| 39 | —$CH_3$ | —$CH_3$ | do | do | do | —$OCH_3$ | —$OCH_3$ | $I^-$ | 572 | 650 |
| 40 | —H | —H | do | do | —$CH_2$—$CH_2$ (—$CH_3$, —$SO_3^-$) | —$CH_3$ | —$CH_3$ | | 558 | 640 |
| 41 | —H | —H | —$CH_2$—$CH_2$—$CH_2$ (—$SO_3^-$) | do | —$C_2H_5$ | —$CH_3$ | Same | | 558 | 640 |
| 42 | —H | —H | —$CH_2$—$CH_2$—COOH | do | Same as above | —H | do | $I^-$ | 553 | 630 |
| 43 | —H | —Cl | Same as above | do | do | —$CH_3$ | do | $I^-$ | 557 | 640 |
| 44 | —H | —$CH_3$ | —$C_2H_5$ | do | —$CH_2$—$CH_2$ (—$CH_2$, —$SO_3^-$) | —$CH_3$ | do | | 560 | 646 |
| 45 | —H | —H | Same as above | do | Same as above | —H | —Cl | | 556 | 640 |
| 46 | —H | —$CH_3$ | do | do | —$CH_2$—$CH_2$ (—COOH) | —$CH_3$ | —H | $I^-$ | 554 | 640 |
| 47 | —H | —H | —$CH_2$—$CH_2$—COOH | do | —$C_2H_5$ | —$CH_3$ | —$CH_3$ | $I^-$ | 555 | 630 |
| 48 | —H | —$CH_3$ | —$C_2H_5$ | —H | —$C_2H_5$ | —$OCH_3$ | —$OCH_3$ | $I^-$ | 582 | 620 |
| 49 | —H | —$CH_3$ | Same as above | —$C_2H_5$ | —$CH_2$—$CH_2$ (—COOH) | —$C_2H_5$ | —H | $I^-$ | 555 | 630 |
| 50 | —H | —Cl | —$CH_2$—$CH_2$—$CH_2$ (—$SO_3^-$) | do | —$C_2H_5$ | —H | —$CH_3$ | | 558 | 640 |

TABLE 1—Continued

| I | $X_1$ | $X_2$ | $B_1$ | A | $B_2$ | $X_3$ | $X_4$ | $Y^{\ominus}$ | II | III |
|---|---|---|---|---|---|---|---|---|---|---|
| 51 | —H | —$CH_3$ | —$C_2H_5$ | do | —$CH_2$—$CH_2$ (COOH) | —$OCH_3$ | —H | $I^-$ | 559 | 654 |
| 52 | —H | —Cl | —$CH_2$—$CH_2$—$CH_2$ ($SO_3^-$) | do | —$C_2H_5$ | —$CH_3$ | —$CH_3$ | | 558 | 640 |
| 53 | —H | —$CH_3$ | —$C_2H_5$ | do | —$CH_2$—$CH_2$ (COOH) | Same | Same | $I^-$ | 555 | 644 |
| 54 | —H | —H | —$C_4H_8$—$SO_3^-$ | do | $C_2H_5$ | —H | —Cl | | 553 | 640 |
| 55 | —H | —H | —$C_2H_5$ | do | Same as above | —H | —Br | $I^-$ | 550 | 640 |
| 56 | —H | —Cl | Same as above | do | —$CH_2$—$CH_2$ ($CH_2$ ($SO_3^-$)) | —H | —$CH_3$ | | 554 | 650 |
| 57 | —H | —H | do | do | —$CH_2$—$CH_2$ (COOH) | —H | —Br | $I^-$ | 549 | 640 |
| 58 [3] | —H | —$CH_3$ | do | do | Same as above | —H | —$CH_3$ | $I^-$ | 554 | 640 |
| 59 | —H | —Br | do | do | —$C_2H_5$ | —H | Same | $I^-$ | 553 | 636 |
| 60 | —H | —Br | —$CH_2$—$CH_2$—COOH | do | Same as above | —H | —Cl | $I^-$ | 554 | 640 |
| 61 | —H | —$CH_3$ | —$C_2H_5$ | do | —$CH_2$—$CH_2$ (COOH) | —$CH_3$ | —$OC_2H_5$ | $I^-$ | 563 | 640 |
| 62 | —H | —Cl | Same as above | do | —$CH_2$—$CH_2$ (O ($SO_3^-$)) | —H | —H | | 554 | 644 |
| 63 | —H | —Br | do | do | —$C_2H_5$ | —$CH_3$ | —$CH_3$ | $I^-$ | 553 | 630 |
| 64 | —H | —$CH_3$ | —$CH_2$—$CH_2$—$CH_2$—$SO_3^-$ | do | Same as above | Same | Same | | 558 | 650 |
| 65 [3] | —H | —Cl | —$C_2H_5$ | do | —$CH_2$—$CH_2$ (COOH) | (4) | —H | | 566 | 644 |
| 66 | —H | —H | —$CH_2$—$CH_2$—O—$SO_3^-$ | do | —$C_2H_5$ | —H | —$CH_3$ | | 554 | 640 |
| 67 | —H | —$OCH_3$ | —$C_2H_5$ | do | —$CH_2$—$CH_2$ ($CH_2$ ($SO_3^-$)) | —H | —Br | | 558 | 650 |

Especially suitable red sensitizers of the Formula I are the compounds of the formulas 2, 6, 8, 35, 65 and especially 7, 10, 11, 20, 43 and 60. From this it follows that compounds that carry on one nitrogen atom an ethyl group, on the other nitrogen atom a propylsulfonic acid or propionic acid residue, in meso-position an ethyl group and on the nuclei chlorine atoms or methyl groups as substituents are especially effective sensitizers in photographic materials for the silver dye bleaching process.

The cyanine dyes to be used according to this invention as red sensitizers in photographic material for the silver dye bleaching process are in part known or can be manufactured by known methods, for example as described in the book of F. M. Hamer "The Cyanine Dyes and Related Compounds," chapters V and VII [Interscience Publishers, New York, 1964]. Further manufacturing processes have been described, inter alia, in German Pat. No. 917,330 and 929,080, French Pat. No. 1,166,246, Belgian Pat. No. 571,034 and in U.S. Pat. No. 2,503,776.

According to one suitable method of manufacturing the sensitizers of the Formula I, for example, a quaternary cycloammonium salt of the formula (XVa)

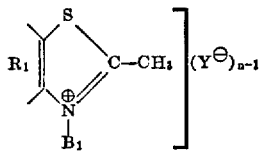

is condensed with a compound of the formula (XVb)

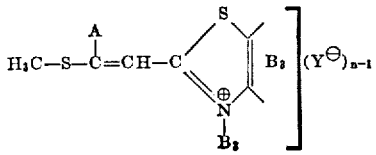

in which formulas A, $B_1$, $B_2$, $R_1$, $R_2$, Y and $n$ have the meanings defined above.

Red sensitizers of the Formula I, which contain acid groups that do not form part of a betainelike structure, can be present as free acids or as salts, especially alkali metal salts, for example sodium or potassium salts.

In the silver dye bleaching process an increase in the sensitivity of the individual layers is specially important when the photosensitive silver halide layer already contains a dye which absorbs exposing light and thereby reduces the effective sensitivity of the layer. The sensitizing of such dyed layers is rendered especially difficult by the fact that the dyes incorporated with the layer not only reduce the sensitivity by absorption but also have a strong desensitizing effect on the emulsion.

According to this invention unexpectedly high relative sensitivities are achieved in sensitizing photographic layers for the silver dye bleaching process by adding a cyanine dye of the Formula I as red senisitizer to the silver salt emulsions containing an azo dye.

Particularly valuable sensitizers of the Formula I are those which are capable of forming the J-band; they are distinguished by a very characteristic sensitivity bond with a steep drop towards the longer wavelengths and have, compared with the absorption maximum in an alcoholic solution, a sensitizing maximum displaced bathochromically by 70 to 120 nm. This formation of a polymerization band, the so-called J-band, referred to as a sensitization of the second order, is technically valuable not only insofar as the location of the sensitizing maximum is concerned but also because of the relative sensitivities attained in this manner.

The red sensitizers to be used according to this invention in photographic material for the silver dye bleaching process have already been used as sensitizers in gelatine emulsions containing color couplers. These gelatine emulsions containing color couplers are used in the manufacture of color photographs based on the principle of chromogenic development. In such layers these sensitizers are distinguished by the fact that their sensitizing effect is not, or at most only very slightly, affected by the presence of the color coupler. Nevertheless, the fact that such sensitizers can also be used in layers containing azo dye for the silver dye bleaching process successfully was unexpected and surprising. Thus, it is known that azo dyes are generally more substantive in dyeing than the colorless components used as couplers; this is especially true of polyazo dyes (to which practically all cyanazo dyes belong) which diminish the sensitizing capacity of the previously used sensitizers. Therefore, it should have been expected that in the layers containing an azo dye for use in the silver dye bleaching process an adequate sensitizing effect of the sensitizer upon the silver halide would not be achieved or would even be totally inhibited. That is to say, it was to be expected that the azo dye could displace the sensitizers adsorbed on the silver halide or that the dye would form an inactive compound with the sensitizer. Therefore, the extremely high increase in sensitivity achieved with the use of the sensitizers according to this invention in the presence of azo dyes, especially polyazo dyes, was entirely unexpected.

It is also known that azo dyes are desensitizers and diminish the sensitivity achieved with conventional cyanine sensitizers.

The high sensitivity obtainable by the sensitizers to be used according to this invention is also found in layers containing azo dyes that are fixed by precipitation with basic precipitants, for example biguanides; this is surprising because it is known that these basic precipitants (biguanides) act as desensitizers so that it should have been expected that their presence in the emulsion would have an unfavorable effect on the sensitivity.

Equally good results are obtained when azo dyes are used that contain phenol groups. It has been known for a long time that azo dyes containing phenol groups have a disturbing influence on the activity of the known sensitizers.

The present sensitizers can be used independently of the kind of silver halide concerned. Apart from gelatine, other colloids can be used as layer formers. Furthermore, the present sensitizers can be used not only in multilayer materials but also, for example, in mixed grain emulsions. The emulsions may further contain casting assistants of all kinds, for example wetting agents, hardeners and/or stabilizers.

It is usual to incorporate the red sensitizers of Formula I with a layer containing a bleachable cyanazo dye.

The percentages shown in the following examples are percentages by weight.

EXAMPLE 1

Equal parts of a silver bromide-iodide emulsion containing 53 g. of silver and 70 g. of gelatine per 1 kg. of emulsion are mixed at 40° C. with different ethanolic solutions of sensitizers so that a sensitizer concentration of 170 mg. per mol of silver results.

| Emulsion: | Sensitizer of formula |
|---|---|
| A | (2) |
| B | (6) |
| C | (7) |
| D | (10) |
| E | (11) |

For comparison, emulsion F is prepared which contains a so-called symmetrical sensitizer which differs from the sensitizers of this invention.

Emulsion F: Sensitizer of the formula (XVI)

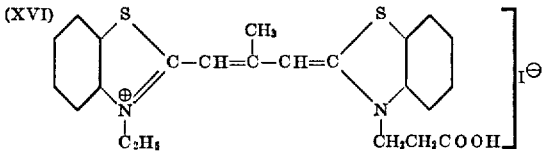

Apart from the usual additives (for example stabilizers, wetting agents, softening agents and hardeners) an aqueous solution of the cyan die of the Formula XVII is added to each emulsion A to F in an amount such that a dye concentration of 13 g. per kg. of emulsion results.

(XVII)

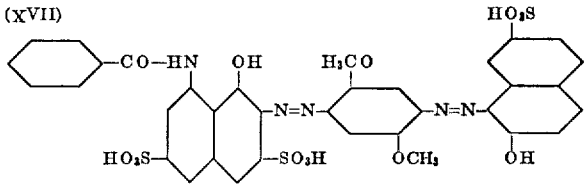

The solutions A to F are cast on a transparent film base so that the coating contains 3 g. of silver per m.². The castings are subjected to sensitometric exposure behind a grey wedge and a yellow filter and then developed as follows:

(1) Development for 6 minutes in a bath that contains per liter of water 50 g. of anhydrous sodium sulfate, 0.2 g. of 1-phenyl-3-pyrazolidone, 6 g. of hydroquinone, 35 g. of anhydrous sodium carbonate, 4 g. of potassium bromide and 0.3 g. of benztriazole;

(2) Washing for 5 minutes, then fixing for 6 minutes in a solution of 200 g. of crystalline sodium thiosulfate and 20 g. of potassium meta-bisulfite in 1 liter of water and washing for another 5 minutes;

(3) Color-bleaching for 3 to 12 minutes with a solution which contains per liter of water 50 to 80 g. of potassium bromide, 40 to 80 g. of thiourea, 35 to 80 g. of 30 percent sulfuric acid and 0.01 g. of 2-amino-3-hydroxyphenazine;

(4) Washing for 10 minutes;

(5) Bleaching of residual silver for 5 minutes with a solution of 60 g. of crystalline copper sulfate, 80 g. of potassium bromide and 15 ml. of 30 percent hydrochloric acid per liter of water, and (6) Washing, fixing and again washing as described under 2.

The unexposed castings of emulsions A to F are also exposed spectrally in a spectrosensitometer. Processing is as described above under 1 and 2, that is to say only a black-white development is carried out.

The results are summarized in the following table. The smaller value of the relative sensitivity log E indicates a higher sensitivity.

| | Spectrum sensitivity maximum in nm. | Color development relative sensitivity log E |
|---|---|---|
| Emulsion according to the invention: | | |
| A | 645 | 3.28 |
| B | 635 | 3.43 |
| C | 645 | 3.17 |
| D | 642 | 3.07 |
| E | 648 | 2.76 |
| Emulsion compared: F | 560 | 3.89 |

The sensitizers used according to this invention in emulsions A to E produce a higher sensitivity and displace the sensitivity maximum towards longer wavelengths than does the symmetrical control sensitizer incorporated in emulsion F. For a red-sensitive emulsion in a color photographic material a sensitization with a maximum of 600 nm. or higher is generally required, and preferably it is within the range from 640 to 700 nm.

EXAMPLE 2

Equal parts of a silver bromide-iodide emulsion of medium sensitivity, containing 21 g. of silver and 90 g. of gelatine per 1 kg. of emulsion, are mixed at 40° C. with different ethanolic solutions of sensitizers so that a sensitizing concentration of 150 mg. per mol of silver results.

| Emulsion: | Sensitizer of the formula |
|---|---|
| A according to the invention | (2) |
| B according to the invention | (6) |
| C according to the invention | (7) |
| D for comparison | (XVI) |

To emulsions A to D there are then added the conventional additives, e.g. stabilizers, wetting agents, softening agents and hardeners, as well as an aqueous solution of the cyan dye of the Formula XVIII in an amount such that a dye concentration of 4 g. per 1 kg. of emulsion results.

(XVIII)

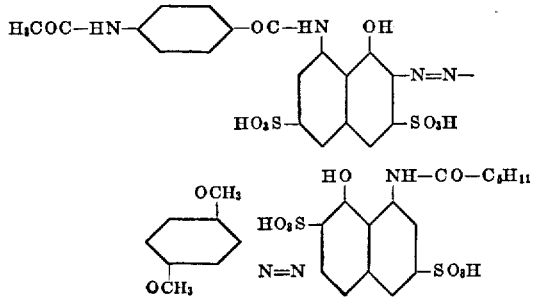

The solutions A to D are cast over a white opaque base to produce a coating containing 1.9 g. of silver per m.$^2$.

The coated material is subjected to spectral exposure under a spectrosensitometer and developed as described under 1 and 2 in Example 1. The sensitization maxima thus achieved are as follows:

| Emulsion: | Sensitization maximum in nm. |
|---|---|
| A according to the invention | 640 |
| B according to the invention | 630 |
| C according to the invention | 640 |
| D for comparison | 600 |

The sensitization maxima that can be obtained with the sensitizers according to this invention are found at higher wavelengths than can be obtained with the sensitizer used for comparison.

EXAMPLE 3

The procedure is as described in Example 2, except that the following sensitizers are used:

| | Sensitizer of the formula | Mg. of sensitizer per mol of silver |
|---|---|---|
| Emulsion: | | |
| A | (6) | 250 |
| B | (10) | 250 |
| C | (11) | 150 |
| D | (XVI) | 150 |

The amounts of sensitizer have been chosen so that a maximal sensitivity is achieved.

The emulsions are cast as described in Example 2, then exposed under a spectrosensitometer and developed as described in Example 1.

The results obtained are shown in the following table:

BLACK-WHITE DEVELOPMENT

| | Rel. sensitivity log E | Sensitivity maximum in nm. | Color development rel. sensitivity log E |
|---|---|---|---|
| Emulsion according to the invention: | | | |
| A | 1.90 | 630 | 3.47 |
| B | 1.39 | 640 | 2.68 |
| C | 1.11 | 650 | 2.74 |
| D for comparison | 2.15 | 600 | 3.76 |

A comparison of the emulsions A to C with D reveals a distinct gain in sensitivity and a shift of the sensitization maximum towards longer waves in the case of the sensitizers to be used according to this invention compared with the sensitizer compared.

EXAMPLE 4

The procedure is as described in Example 3, except that instead of the cyan dye of the Formula XVIII the dye of the formula (XIX)

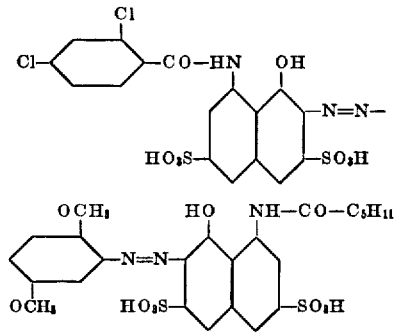

is used in a concentration of 3.6 g. per 1 kg. of emulsion.

The sensitizers of the Formulas 6, 10 and 11 produce similarly improved relative sensitivities and sensitization maxima shifted towards longer waves as shown in Example 3.

EXAMPLE 5

The procedure is as described in Example 2, except that the following sensitizers are used in a concentration of 150 mg. of sensitizer per mol of silver.

| Emulsion: | Sensitizer of formula |
|---|---|
| A | (1) |
| B | (2) |
| C | (7) |
| D | (XX) |
| E | (XVI) |

(XX)

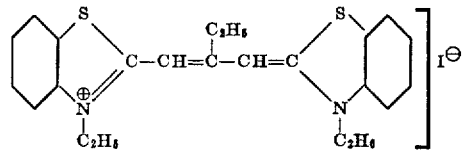

The image dye used is the dye of the Formula XIX in an amount such that a dye concentration of 3.6 g. per kg. of emulsion results.

The emulsion is cast as described in Example 2, and then spectrally exposed and developed as described in Example 1.

The following sensitization maxima are found:

| Emulsion: | Sensitization maximum in nm. |
|---|---|
| A according to the invention | 635 |
| B according to the invention | 640 |
| C according to the invention | 642 |
| D for comparison | 590 |
| E for comparison | 600 |

Compared with the control sensitizers the sensitizers to be used according to this invention display a distinct shift of the sensitization maximum.

EXAMPLE 6

The procedure is as described in Example 1, except that a concentration of 200 mg. of sensitizer per mol of silver is used and a coating containing 1.6 g. of silver per m.² is produced with the following sensitizers:

| Emulsion: | Sensitizer of formula |
|---|---|
| A | 35 |
| B | 60 |
| C | 65 |
| D | XXI |

For comparison emulsion D is prepared which contains a so-called symmetrical senstizer that is different from the sensitizers to be used according to this invention.

(XXI)

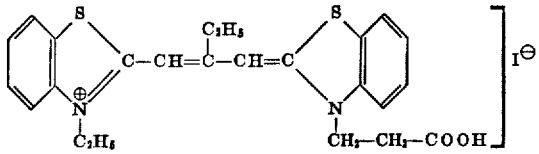

The results are shown in the following table:

| | Spectrum sensitivity maximum in nm. | Color development relative sensitivity log E |
|---|---|---|
| Emulsion: | | |
| A | 650 | 4.67 |
| B | 650 | 3.93 |
| C | 655 | 4.25 |
| D | 645 | 4.81 |

A comparison of emulsions A to C with D reveals a distinct gain in sensitivity and a shift of the sensitization maximum towards longer waves in the case of the sensitizers to be used according to the invention as against the sensitizer compared.

EXAMPLE 7

The procedure is as described in Example 1, except that a concentration of 200 mg. of sensitizer per mol of silver is used and a coating containing 1.6 g. of silver per m.² is produced with the following sensitizers:

| Emulsion: | Sensitizer of formula |
|---|---|
| A | 8. |
| B | 20. |
| C | 35. |
| D | 43. |
| E | 60. |
| F | 62. |
| G | 65. |
| H | XXI for comparison. |

The image dye used is the dye of the Formula XVIII in an amount such that a dye concentration of 19.5 g. per 1 kg. of emulsion results.

The results are listed in the following table:

| | Spectrum sensitivity maximum in nm. | Color development relative sensitivity log E |
|---|---|---|
| Emulsion: | | |
| A | 640 | 3.56 |
| B | 645 | 3.28 |
| C | 650 | 3.89 |
| D | 650 | 4.55 |
| E | 645 | 3.33 |
| F | 650 | 4.55 |
| G | 655 | 3.52 |
| H | 580 | (1) |

[1] Faint image not determinable.

A comparison of emulsions A to G with H reveals a distinct gain in sensitivity and a shift of the sensitization maximum towards longer waves in the case of the sensitizers to be used according to this invention as against the sensitizer compared.

EXAMPLE 8

The procedure is as described in Example 2, except that a concentration of 200 mg. of sensitizer per mol of silver is used and a coating is produced, which contains 1.5 g. of silver per m.² with the following sensitizers:

| Emulsion: | Sensitizer of formula |
|---|---|
| A | 8. |
| B | 20. |
| C | 35. |
| D | 43. |
| E | 60. |
| F | 62. |
| G | 65. |
| H | XX for comparison. |

The image dye used is the dye of the Formula XVII in an amount such that a dye concentration of 2.6 g. per 1 kg. of emulsion results.

The results are shown in the following table:

| | Spectrum sensitivity maximum in nm. | Color development relative sensitivity log E |
|---|---|---|
| Emulsion: | | |
| A | 640 | 3.90 |
| B | 640 | 3.38 |
| C | 645 | 4.42 |
| D | 640 | 3.51 |
| E | 645 | 3.34 |
| F | 645 | 4.12 |
| G | 650 | 3.85 |
| H | 640 | 4.64 |

A comparison of emulsions A to G with H reveals a distinct gain in sensitivity and, in some cases, a shift of the sensitization maximum towards longer waves in the case of the sensitizers to be used according to this invention as against the sensitizer compared.

EXAMPLE 9

The procedure is as described in Example 2, except that a concentration of 200 mg. of sensitizer per mol of silver is used and a coating containing 1.5 g. of silver per m.² is produced with the following sensitizers:

| Emulsion: | Sensitizer of formula |
|---|---|
| A | 8 |
| B | 20 |
| C | 35 |
| D | 43 |
| E | 60 |
| F | 62 |
| G | 65 |
| H | XXI for comparison |

The results are listed in the following table:

| | Spectrum sensitivity maximum in nm. | Color development relative sensitivity log E |
|---|---|---|
| Emulsion: | | |
| A | 635 | 3.18 |
| B | 645 | 2.56 |
| C | 645 | 2.81 |
| D | 640 | 2.59 |
| E | 645 | 2.86 |
| F | 640 | 4.20 |
| G | 650 | 2.65 |
| H | 575 | (1) |

[1] Faint image not determinable.

A comparison of emulsions A to G with H reveals a distinct gain in sensitivity and a shift of the sensitization maximum towards longer waves in the case of the sensitizers to be used according to this invention as against the sensitizer compared.

EXAMPLE 10

The procedure is as described in Example 2, except that a concentration of 200 mg. of sensitizer per mol of silver is used and a coating containing 1.5 g. of silver per m.$^2$ is produced with the following sensitizers:

| Emulsion: | Sensitizer of formula |
|---|---|
| A | 35 |
| B | 60 |
| C | 65 |
| D | XXII |

For comparison emulsion D is prepared; it contains a so-called symmetrical sensitizer that is different from the sensitizers to be used according to this invention and corresponds to the formula (XXII)

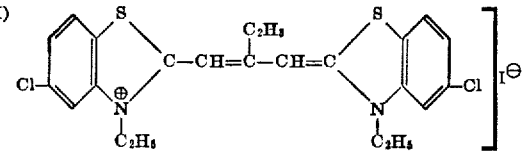

The results are shown in the following table:

| | Spectrum sensitivity maximum in nm. | Color development relative sensitivity log E |
|---|---|---|
| Emulsion: | | |
| A | 645 | 2.81 |
| D | 645 | 2.86 |
| C | 650 | 2.65 |
| D | 640 | 3.11 |

A comparison of emulsions A to C with D reveals a distinct gain in sensitivity and a shift of the sensitization maximum towards longer waves in the case of the sensitizers to be used according to the invention as against the sensitizer compared.

We claim:

1. A photographic material *for the silver dye bleaching process which contains in at least one silver halide emulson layer, as image dye, a bleachable azo dye,* which *layer* contains a red sensitizer of the formula

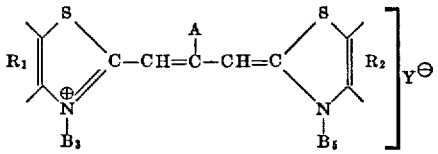

in which A is an alkyl group containing one to four carbon atoms; $B_3$ and $B_5$ independently are an alkyl group containing one to four carbon atoms or an alkylcarboxylic acid group containing one to five carbon atoms, provided that both $B_3$ and $B_5$ are not simultaneously alkylcarboxylic acid groups, $R_1$ and $R_2$ are different aromatic ring systems fused on in the manner indicated by the valency lines and containing at most two six-membered rings; $Y^{\ominus}$ is an anion.

2. A photographic material as claimed in claim 1, which contains a red sensitizer of the formula

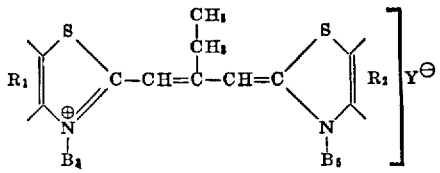

3. A photographic material as claimed in claim 1, which contains a red sensitizer of the formula

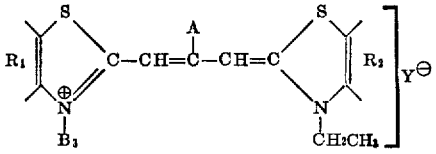

in which $B_3$ represents an ethyl, methylcarboxylic or ethylcarboxylic acid radical.

4. A photographic material as claimed in claim 1, which contains a red sensitizer of the formula

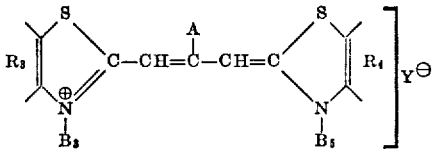

in which $R_3$ and $R_4$ are different benzene or naphthalene radicals which are fused on in the manner indicated by the valency lines and are substituted by hydrogen or halogen atoms or by alkyl or alkoxy groups each containing one to three carbon atoms.

5. A photographic material as claimed in claim 1, which contains a red sensitizer of the formula

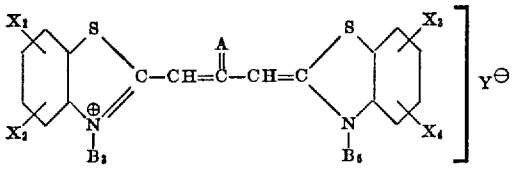

in which $X_1$, $X_2$, $X_3$ and $X_4$ each is a hydrogen or halogen atom, or an alkyl or alkoxy group each containing one to three carbon atoms, and in which the substituent pair $X_1/X_2$ differs from the substituent pair $X_3/X_4$ as to type or position.

6. A photographic material as claimed in claim 5, which contains a red sensitizer of the formula

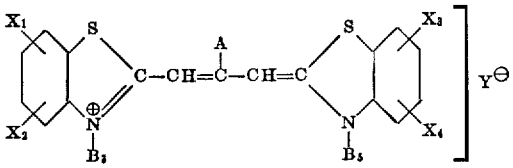

in which the substituent pair $X_1/X_2$ differs from the substituent pair $X_3/X_4$.

7. A photographic material as claimed in claim 5, which contains a red sensitizer of the formula

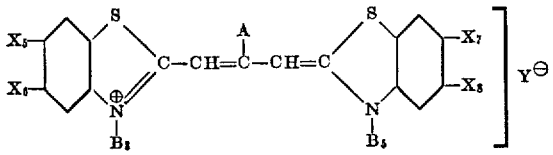

in which $X_5$, $X_6$, $X_7$ and $X_8$ each represents a hydrogen or chlorine atom or a methyl, methoxy or ethoxy group and the substituent pair $X_5/X_6$ differs from the substituent pair $X_7/X_8$.

8. A photographic material as claimed in claim 7, which contains a red sensitizer of the formula

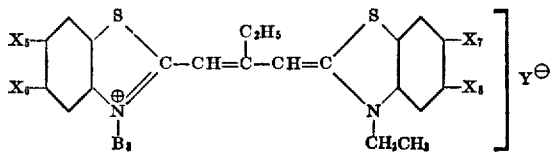

9. A photographic material as claimed in claim 1, which contains the red sensitizer of the formula

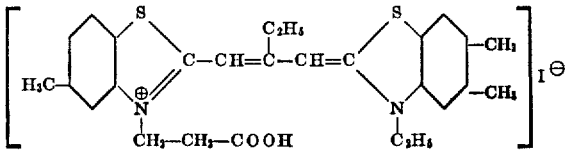

10. A photographic material as claimed in claim 1, which contains the red sensitizer of the formula

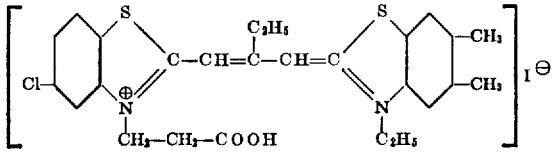

References Cited

The following references, cited by the Examiner, are of record in the patented file of this patent or the original patent.

UNITED STATES PATENTS

| | | | |
|---|---|---|---|
| 2,503,776 | 4/1950 | Sprague | 96—106 X |
| 3,157,507 | 11/1964 | Bruengger et al. | |
| 3,255,012 | 6/1966 | Glockner et al. | 96—106 |
| 3,348,949 | 10/1967 | Bannert et al. | 96—106 |

J. TRAVIS BROWN, Primary Examiner

J. L. GOODROW, Assistant Examiner

U.S. Cl. X.R.

96—126, 137